US008444318B2

(12) United States Patent
Huck et al.

(10) Patent No.: US 8,444,318 B2
(45) Date of Patent: May 21, 2013

(54) TEMPERATURE SENSOR FOR A PROCESS ENGINEERING INDUSTRIAL INSTALLATION

(75) Inventors: Ralf Huck, Großkrotzenburg (DE); Ulrich Staab, Biebergemünd/Kassel (DE)

(73) Assignee: ABB Technology AG, Zurich (CH)

( * ) Notice: Subject to any disclaimer, the term of this patent is extended or adjusted under 35 U.S.C. 154(b) by 757 days.

(21) Appl. No.: 12/540,210

(22) Filed: Aug. 12, 2009

(65) Prior Publication Data
US 2010/0040112 A1     Feb. 18, 2010

(30) Foreign Application Priority Data
Aug. 13, 2008 (DE) .......................... 10 2008 038 875

(51) Int. Cl.
*G01K 1/14*     (2006.01)
*G01K 7/16*     (2006.01)

(52) U.S. Cl.
USPC ............................ 374/208; 374/185; 374/141

(58) Field of Classification Search ............... 374/100, 374/163, 120, 121, 183, 185, 208, 141, 179, 374/142–148, 152; 600/474, 549; 702/130–136
See application file for complete search history.

(56) References Cited

U.S. PATENT DOCUMENTS

| | | | | |
|---|---|---|---|---|
| 2,967,428 A | * | 1/1961 | Burgert ......................... | 374/155 |
| 3,751,798 A | | 8/1973 | Altshuler | |
| 4,718,776 A | * | 1/1988 | Gilland et al. ................ | 374/170 |
| 5,165,798 A | * | 11/1992 | Watanabe ...................... | 374/208 |
| 5,449,234 A | * | 9/1995 | Gipp et al. ...................... | 374/185 |
| 5,575,563 A | * | 11/1996 | Chiu et al. ..................... | 374/141 |
| 5,728,505 A | | 3/1998 | Dueber et al. | |
| 5,741,074 A | * | 4/1998 | Wang et al. .................... | 374/185 |
| 6,000,845 A | * | 12/1999 | Tymkewicz et al. .......... | 374/155 |
| 6,588,931 B2 | * | 7/2003 | Betzner et al. ................ | 374/185 |

(Continued)

FOREIGN PATENT DOCUMENTS
DE     82 09 964 U1     7/1982
DE     82 33 961 U1     6/1983

(Continued)

OTHER PUBLICATIONS

*"Die neue Generation der Temperaturfühler für die Prozessindustrie" [The new generation of temperature sensors for the process industry], ABB Automation Products GmbH, edition Apr. 2006, print No. PB/TSP 100/300-DE (English language version also attached) (8 pages total).

(Continued)

*Primary Examiner* — Gail Verbitsky
(74) *Attorney, Agent, or Firm* — Buchanan Ingersoll & Rooney PC

(57) ABSTRACT

A temperature sensor is disclosed having a measuring resistor which is accommodated inside a protective tube and a proximal end of which is connected to a sensor head. The sensor head includes a measurement insert for electrically connecting the measuring resistor and a measuring transducer which is connected downstream thereof to, for example, condition measurement signals. The sensor head is formed by a cylindrical housing having an intermediate base, the measurement insert being accommodated in a lower housing section which is adjacent to the measuring resistor and is sectioned off by the intermediate base, and the measuring transducer being accommodated in an opposite, upper housing section.

16 Claims, 3 Drawing Sheets

U.S. PATENT DOCUMENTS

| | | | |
|---|---|---|---|
| 7,052,471 B2* | 5/2006 | Lussier et al. | 600/549 |
| 2002/0163955 A1* | 11/2002 | Yu | 374/208 |
| 2006/0215731 A1* | 9/2006 | Gadonniex et al. | 374/208 |
| 2007/0098038 A1* | 5/2007 | Carroll | 374/146 |
| 2007/0116084 A1* | 5/2007 | Rund et al. | 374/100 |
| 2007/0217480 A1* | 9/2007 | Lai | 374/208 |
| 2008/0165828 A1* | 7/2008 | Seki et al. | 374/208 |
| 2010/0135357 A1* | 6/2010 | Chancy | 374/179 |
| 2010/0202492 A1* | 8/2010 | Larimer et al. | 374/185 |
| 2010/0239204 A1* | 9/2010 | Kaikogi et al. | 384/605 |
| 2011/0054822 A1* | 3/2011 | Bauschke et al. | 702/99 |
| 2011/0235679 A1* | 9/2011 | Cordeiro et al. | 374/208 |
| 2012/0031517 A1* | 2/2012 | Yoshida et al. | 138/103 |

FOREIGN PATENT DOCUMENTS

| | | |
|---|---|---|
| DE | 38 12 195 A1 | 11/1988 |
| DE | 40 20 167 C1 | 6/1991 |
| DE | 696 10 516 T2 | 5/2001 |
| DE | 10 2005 059 759 A1 | 6/2007 |
| DE | 10 2006 005 596 B4 | 7/2008 |
| EP | 0 957 348 A1 | 11/1999 |

OTHER PUBLICATIONS

*German Examination Report dated Mar. 13, 2009.
*German Examination Report dated Mar. 6, 2009.
U.S. patent application filed on Aug. 12, 2009 entitled "Temperature Sensor" naming Christian Schroll, Manfred Wetzko and Ralf Huck as inventors; available in U.S. Patent and Trademark Office's IFW system.

* cited by examiner

TEMPERATURE SENSOR FOR A PROCESS ENGINEERING INDUSTRIAL INSTALLATION

RELATED APPLICATIONS

This application claims priority under 35 U.S.C. §119 to German Patent Application No. 10 2008 038 875.0 filed in Germany on Aug. 13, 2008, the entire content of which is hereby incorporated by reference in its entirety.

FIELD

The present disclosure relates to a temperature sensor having a measuring resistor which can be accommodated inside a tube, the proximal end of which is connected to a sensor head. The sensor head includes a measurement insert for electrically connecting the measuring resistor and a measuring transducer which is connected downstream thereof to condition measurement signals.

BACKGROUND INFORMATION

Process engineering industrial installations are known in which temperature is a process variable to be recorded by metrology and supplied to an electronic controller for signal processing. Such process engineering industrial installations are used, for example, in petrochemistry, in energy and steam generation, in the food and luxury consumables industry and in general process engineering.

Known temperature sensors for such industrial installations include a fastening flange, by which a measuring resistor of the temperature sensor projects inside a container or a pipeline in order to record the temperature of the medium in the container or pipe here. Located outside the latter is the sensor head of the temperature sensor, which head accommodates electronic components, such as a measuring transducer for measurement signal conditioning, an optical display unit and the like, such that they are protected in a housing.

A temperature sensor is known from the brochure "Die neue Generation der Temperaturfühler für die Prozessindustrie" [The new generation of temperature sensors for the process industry] (ABB Automation Products GmbH, edition 04.2006, print number PB/TSP 100/300-DE). A high level of variance in uses which can be covered is achieved by a modular construction of standard components. The modular system essentially includes a sensor head with an integrated measurement insert, the electrical contact-connection of which on the part of the measuring resistor is achieved using contact-pressure springs. A measuring transducer may be optionally integrated in the sensor head and connected to the measurement insert. In order to protect these electrical and electronic components from external environmental influences, a sealed housing surrounds the sensor head. In order to protect the temperature sensor from the process conditions and to allow replacement without interrupting the ongoing process, a protective tube having process connections in the form of flanges or threads is provided, an outer neck tube in the continuation of the protective tube providing the connection between the protective tube and the sensor head. The sensor head can be used to effect the necessary connection of external cables to the measuring transducer which can be integrated therein and is intended to condition measurement signals.

Since aging of the components can be expected during operation of the temperature sensor, in particular in the case of high temperatures or temperatures which change frequently, industrial temperature sensors are designed with a replaceable measurement insert. However, so that the measuring transducer (also referred to as a transmitter) does not have to be exchanged as well at the same time as the measurement insert is changed, a cover which can usually be folded is mounted on the sensor head and is connected to the measurement insert using short connecting lines. The signal or bus line connections coming from a superordinate controller are placed directly on the measuring transducer. Therefore, although it is possible to replace the measurement insert without dismantling the measuring transducer after the connecting lines have been released on one side, this solution involves a hinged cover of a relatively considerable height, which can be disadvantageous, in particular in conditions of use with considerable vibration. However, this type of mounting is unsuitable for a screw cap if considered as an alternative to the hinged cover since the electrical connection lines would wind up when closing a screw cap.

Another known form of construction for temperature sensors which are intended for process engineering industrial installations provides for the measuring transducer to be permanently screwed to the resiliently mounted measurement insert. The above-described replacement of a measurement insert is no longer possible as a result of the permanent connection. In addition, should an optical display unit for displaying operating states and/or the current measured temperature also be concomitantly integrated in the sensor head, this is not possible in conjunction with the above-described mounting of the measuring transducer in a hinged cover since the measuring transducer occupies the only installation space in the hinged cover. In principle, although the display unit and the measuring transducer can form a common structural unit which can then be jointly mounted inside the sensor head, this can be unfavorable for the operability of a keyboard of the display unit.

It is known practice, in connection with screw-on covers, to directly mount the display unit on a measuring transformer which is connected to the measurement insert. With this form of construction, operation is possible after the cover has been unscrewed. However, the resilient mounting results in an undefined position of the display, which can be disadvantageous as regards the ability to read the display inside the housing which surrounds the sensor head and has viewing glass.

Another known form of construction provides for a display unit to be fastened in a stationary manner to a type of mounting bracket above the component combination of the measurement insert and measuring transformer. Although the display unit is thereby arranged in a stationary manner directly behind the viewing glass of a screw-on cover, a technically very complicated, electrically flexible connecting technique with respect to the measuring transducer is involved for implementation since the latter is fastened on the resiliently mounted measurement insert. This arrangement of the measurement insert with a measuring transducer mounted directly on it and with a display unit remote therefrom also results in a form of construction which is likewise very high, which is disadvantageous with respect to sensitivity to vibrations. In addition, exchange of the measurement insert is more laborious in comparison with the solutions discussed above since electrical connection lines of the display unit need to be separated from the measurements insert and the mounting bracket needs to be opened.

SUMMARY

A temperature sensor is disclosed which comprises a measuring resistor which is accommodated inside a tube having a proximal end, and a sensor head with a measurement insert for electrically connecting the measuring resistor with a measuring transducer located downstream thereof to condition measurement signals, the sensor head being connected to the proximal end and being formed by a housing having an intermediate base, the measurement insert being accommodated in a lower housing section which is adjacent to the measuring resistor and is sectioned off by the intermediate base, and the measuring transducer being accommodated in an opposite, upper housing section.

BRIEF DESCRIPTION OF THE DRAWINGS

Further measures which improve the disclosure are described in more detail below in conjunction with the description of exemplary embodiments of the disclosure using the figures, in which.

DETAILED DESCRIPTION

Figure 1:
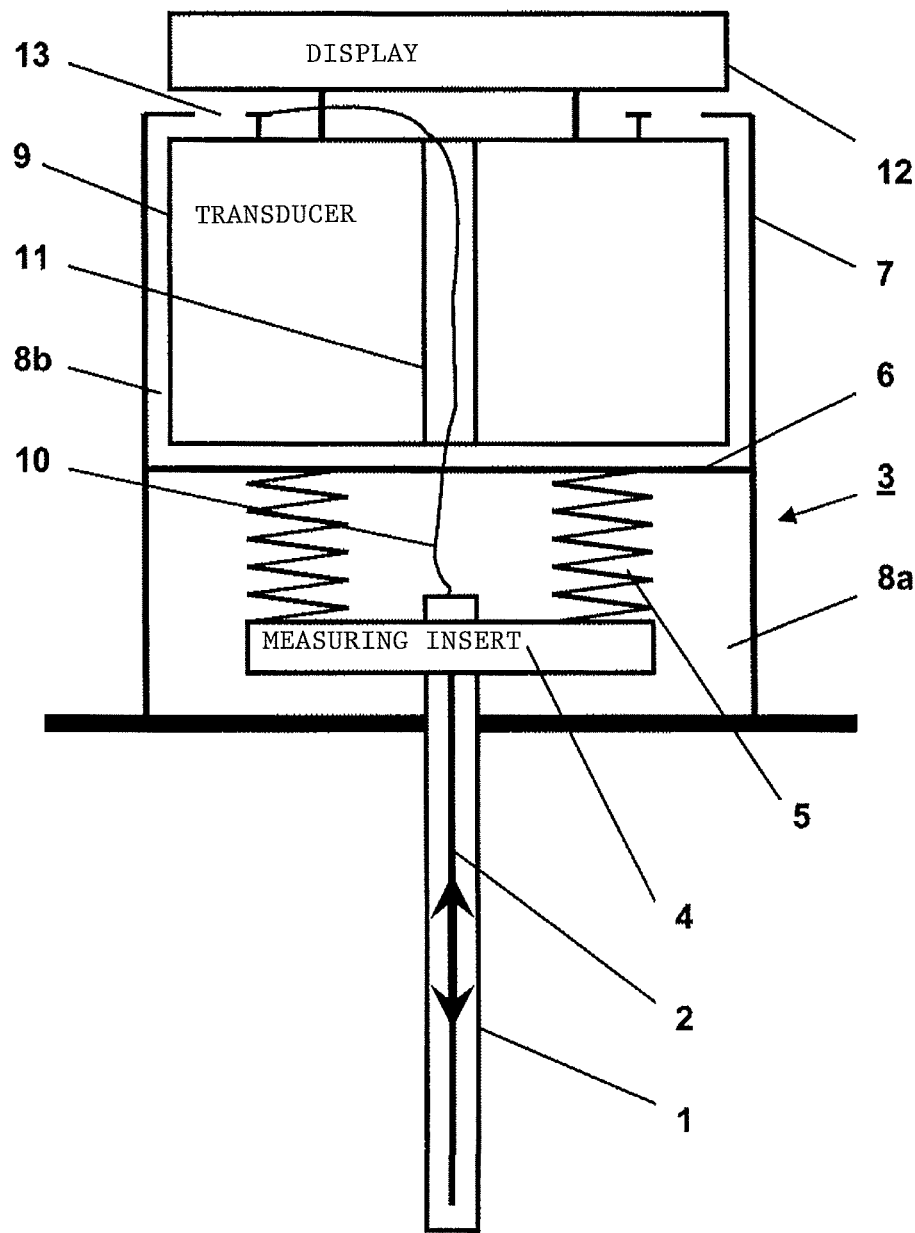
FIG. 1 shows a schematic longitudinal view of a first exemplary embodiment of a temperature sensor having a plurality of contact-pressure springs.

A temperature sensor is disclosed which can be used in combination with a process engineering industrial installation. An exemplary temperature sensor can allow a measuring transducer and a measurement insert to be arranged inside a sensor head in an integrated manner which can save space, in a secure manner with a low construction, which integrated measurement insert can be replaced in a simple manner.

The sensor head can be formed by a cylindrical housing having an intermediate base, the measurement insert being accommodated in a lower housing section which is adjacent to the measuring resistor and is sectioned off by the intermediate base, and the measuring transducer being accommodated in the upper housing section such that it is opposite.

An exemplary advantage of a solution according to the disclosure is that the intermediate base has created an additional possibility for fastening the measuring transducer independently of the measurement insert, which possibility also simultaneously subdivides the housing into separate housing sections, which allows replaceability independently of the adjacent electrical component. The measurement insert can thus be resiliently mounted separately in the lower housing section and the measuring transducer can be releasably fastened to the intermediate base independently thereof.

The releasable connection between the measuring transducer and the intermediate base of the housing can be in the form of a clip connection in order to allow simple replacement without additional fastening means. It is proposed to also releasably fasten the measurement insert, which is arranged inside the lower housing section, to the housing by, for example, means of a clip or other similar connection. Where there is no permanent contact with the intermediate base at this point, wall fastening can be used.

Another measure involves providing the measuring transducer and the intermediate base with a central longitudinal hole through which a sensor line of the measurement insert is guided. As a result of this measure, a sensor line does not need to be guided between the measuring transducer and the wall of the housing and an exactly coaxial structure of the different components can also be implemented in this respect.

The measuring resistor can be electrically connected to the measurement insert according to two exemplary embodiments. A first embodiment proposes providing the measurement insert with a single coaxial contact-pressure spring. In this case, the intermediate base can be in the form of a pot such that the latter partially enters the interior of the surrounding contact-pressure spring in order to form a small arrangement. The coaxial contact-pressure spring which also runs around the inserted measuring transducer in this respect does not involve any additional installation space when the block length is compressed. Alternatively, according to a second embodiment, it is also possible to provide a plurality of contact-pressure springs between the measuring resistor and the measurement insert. The springs can include a longitudinal cross section whose basic shape is conical. As a result of the fact that the diameter decreases along the length owing to this, the block length corresponds only to the simple wire diameter, with the result that a space-saving solution can also be achieved thereby.

Another exemplary measure involves putting an optical display unit on the end face of the measuring transducer. In this case, the connection can be such that an intermediate gap results between the display unit and the measuring transducer. The intermediate gap can be used to accommodate at least the sensor line which runs through the abovementioned central longitudinal hole of the measuring transducer. The display unit can be electrically and thus also mechanically connected to the measuring transducer, for example, by means of a force-fitting plug-in contact-connection.

In an exemplary embodiment, it is proposed to mechanically fasten the measuring transducer to the intermediate base by means of, for example, a clip connection which can be unlocked. The display unit can therefore be removed without the measuring transducer also being unintentionally pulled from its fastening at the same time.

The housing of the sensor head can comprise an integrally injection-molded component made of plastic or light metal. This type of production makes it possible to produce the intermediate base according to the subject matter of the disclosure in a simple manner in terms of production technology. The choice of material for the housing depends, for example, on the conditions of use of the temperature sensor.

A screw cap can be provided in order to tightly close the housing. Should a display unit be integrated in the upper housing part, a viewing window should also be integrated in the associated screw cap. The use of screw caps with sealing rings which are, for example, inserted in the latter allows the electrical and electronic components accommodated in the housing to be reliably protected from external environmental influences.

According to FIG. 1, an exemplary temperature sensor as disclosed herein comprises a lower protective tube 1 in which a measuring resistor 2 is accommodated such that it is protected. The measuring resistor 2 comprises a temperature-sensitive resistance wire whose connections on both sides project into a sensor head 3. In the sensor head 3, the ends of the measuring resistor 2 are soldered to a measurement insert 4. The measurement insert 4 is supported against an intermediate base 6 of a housing 7 which surrounds the sensor head 3 by means of a plurality of contact-pressure springs 5 which are arranged at a distance from one another. As a result of this arrangement, the measurement insert 4 is accommodated in a lower housing section 8a which is adjacent to the measuring resistor 2 and is sectioned off by the intermediate base 6. The housing 7 also has an opposite, upper housing section 8b which is likewise formed by the intermediate base 6.

A measuring transducer 9 can be accommodated in the upper housing section 8b. For example, the measuring transducer 9 can be cylindrical (or other suitable shape) and can occupy approximately the entire installation space inside the upper housing section 8b. The cylindrical measuring transducer 9 can be releasably fitted (i.e., via a releasable connection) to the intermediate base 6 of the housing 7, by means of, for example, a clip connection which can be unlocked.

In order to guide a sensor line 10 which extends from the measurement insert 4, the measuring transducer 9 and the intermediate base 6 have a central longitudinal hole 11. An optical display unit 12 is placed on the end face of the measuring transducer 9. The fastening can be effected by means of a line-free electrical plug-in contact-connection so as to leave an intermediate gap 13 which remains between the measuring transducer 9 and the display unit 12. The intermediate gap 13 can be used to accommodate the sensor line 10 in order to electrically connect the latter to the measuring transducer in the region of the intermediate gap 13. Both sides of the housing 7 can be releasably closed using a screw cap, the measurement insert 4 and the measuring transducer 9 being able to be separately replaced after the screw cap has been removed (as shown).

Figure 2:
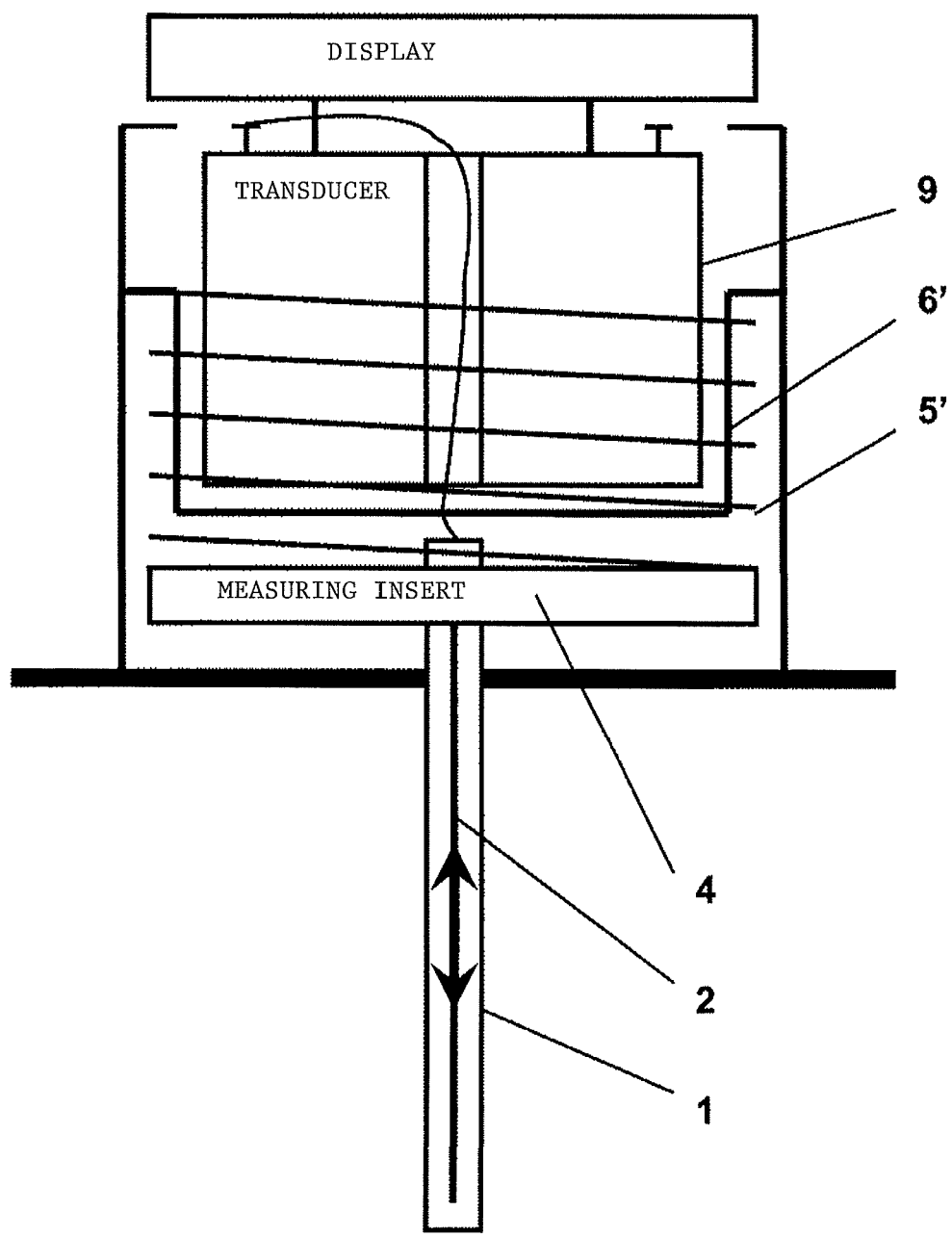
FIG. 2 shows a schematic longitudinal view of a second exemplary embodiment of a temperature sensor having a single coaxial contact-pressure spring.

A second exemplary embodiment shown in FIG. 2 is distinguished by a particularly low overall height. The low overall height is, for example, achieved by means of an intermediate base 6' in the form of a pot. Placed around the intermediate base 6' as well as the measuring transducer 9 fitted to the latter is, for example, a single coaxial contact-pressure spring 5' which corresponds to the measurement insert 4 at its end opposite the intermediate base 6'. Otherwise, the structure and function of this embodiment correspond to those of the first embodiment described in detail above.

Figure 3:
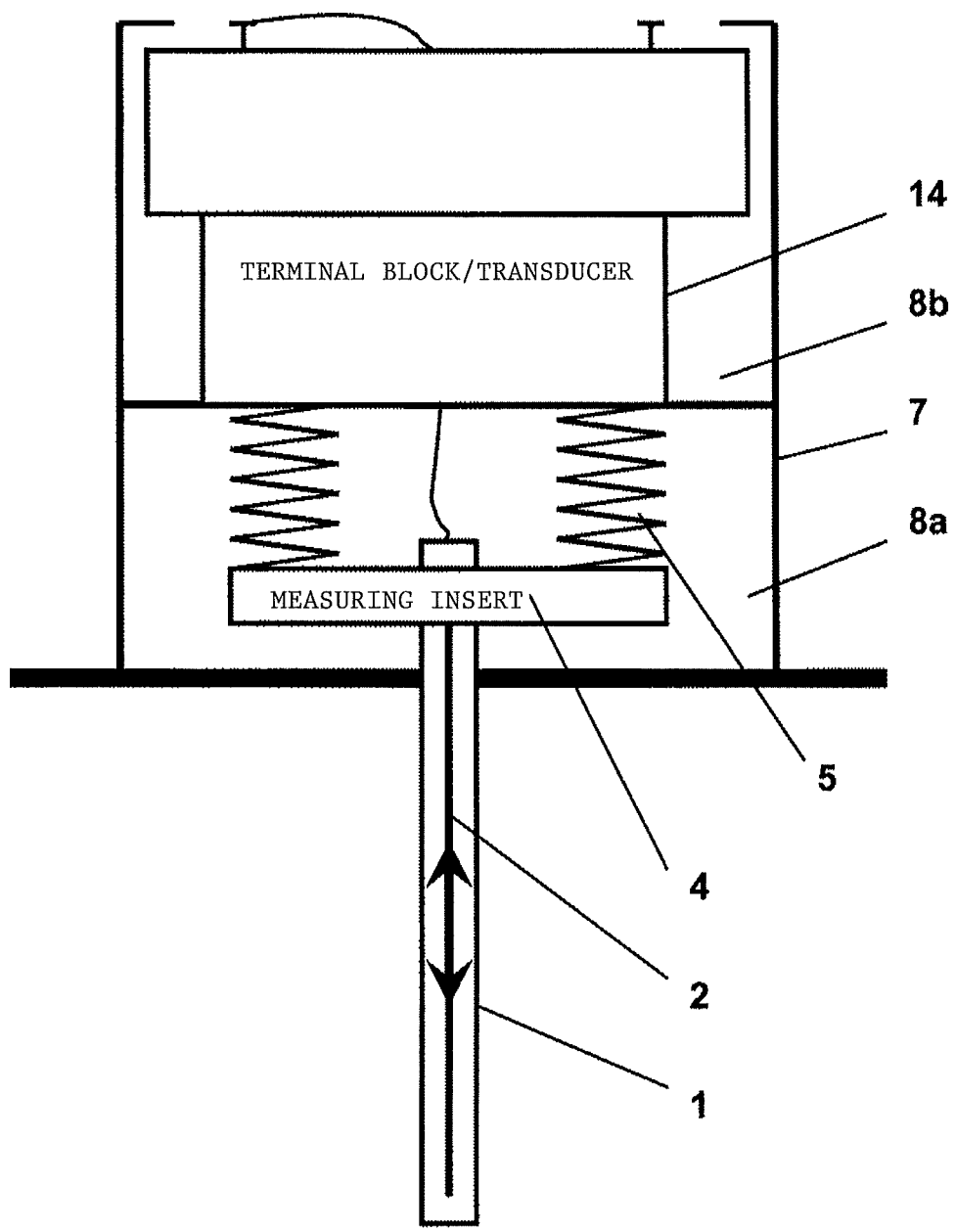
FIG. 3 shows a schematic longitudinal view of a third exemplary embodiment of a temperature sensor having a terminal block and transmitter preparation.

A third exemplary embodiment illustrated in FIG. 3 shows a replaceable measurement insert 4 inside the lower housing section 8a. In contrast, the upper housing section 8b of the housing 7 accommodates a terminal block 14 with measuring transducer preparation. Plural contact-pressure springs 5, with longitudinal sections that are, for example, substantially conical, electrically connect the measuring resistor to the measurement insert.

The passive terminal block 14 which is matched to the measuring transducer 9 in terms of its structural interfaces—such as diameter, latching apparatus and clamping—makes it possible to easily expand from the passive system without a measuring transducer (as illustrated) to an active system with a measuring transducer at a later point in time. For this purpose, the terminal block 14 is replaced with a measuring transducer 9, as shown in FIG. 2.

The disclosure is not restricted to the exemplary embodiments described above. Rather, modifications thereof which are concomitantly included in the scope of protection of the following claims are also encompassed. For example, it is also possible for the housing to be closed with other cover means, which may also have, for example, a bayonet closure or a latching mechanism, instead of with a screw cap. In addition, it is also possible to specify a flange joint. However, all exemplary embodiments must ensure that the housing is tightly closed so that the internal electrical and electronic components are accommodated such that they are sufficiently protected.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols
1 Protective tube
2 Measuring resistor
3 Sensor head
4 Measurement insert
5 Contact-pressure spring
6 Intermediate base
7 Housing
8 Housing section
9 Measuring transducer
10 Sensor line
11 Longitudinal hole
12 Display unit
13 Intermediate gap
14 Terminal block

What is claimed is:

1. A temperature sensor, comprising:
a measuring resistor which is accommodated inside a protective tube having a proximal end;
a sensor head with a measurement insert for electrically connecting the measuring resistor with a measuring transducer located downstream thereof to condition measurement signals, the sensor head being connected to the proximal end and being formed by a housing having an intermediate base, the measurement insert being accommodated in a lower housing section which is adjacent to the measuring resistor and is sectioned off by the intermediate base, and the measuring transducer being accommodated in an opposite, upper housing section such that the measurement insert and the measuring transducer are individually detachable from the intermediate base;
a single coaxial contact-pressure spring to electrically connect the measuring resistor to the measurement insert, wherein the spring is configured with the intermediate base, formed as a pot, to at least partially axially surround the measuring transducer.

2. The temperature sensor as claimed in claim 1, comprising:
a releasable connection for connecting the measuring transducer, which is a cylindrical transducer arranged inside the upper housing section, to the intermediate base.

3. The temperature sensor as claimed in claim 1, comprising:
a releasable connection for connecting the measurement insert, which is arranged inside the lower housing section, to the housing.

4. The temperature sensor as claimed in claim 2, wherein the releasable connection is a clip connection.

5. The temperature sensor as claimed in claim 1, wherein the measuring transducer and the intermediate base have a central longitudinal hole through which a sensor line of the measurement insert is guided.

6. The temperature sensor as claimed in claim 1, comprising:
an optical display unit configured to effect line-free electrical plug-in contact-connection, the display unit being fitted to an end face of the measuring transducer.

7. The temperature sensor as claimed in claim 6, wherein the display unit is fitted to the measuring transducer to maintain an intermediate gap for accommodating at least a sensor line of the measurement insert.

8. The temperature sensor as claimed in claim 2, comprising:
a clip means which can be unlocked, for mechanically fastening the measuring transducer to the intermediate base of the housing.

9. The temperature sensor as claimed in claim 1, wherein the housing of the sensor head is integrally configured as at least one of an injection-molded plastic part and light metal part.

10. The temperature sensor as claimed in claim 1, comprising:
a screw cap to releasably close the housing.

11. The temperature sensor of claim 1, in combination with a process engineering industrial installation.

12. The temperature sensor of claim 1, wherein the housing is cylindrical.

13. The temperature sensor as claimed in claim 3, wherein the releasable connection is a clip connection.

14. The temperature sensor as claimed in claim 7, wherein the housing of the sensor head is integrally configured as at least one of an injection-molded plastic part and a light metal part.

15. The temperature sensor as claimed in claim 14, comprising:
a screw cap to releasably close the housing.

16. A temperature sensor, comprising:
a measuring resistor which is accommodated inside a protective tube having a proximal end;
a sensor head with a measurement insert for electrically connecting the measuring resistor with a measuring transducer located downstream thereof to condition measurement signals, the sensor head being connected to the proximal end and being formed by a housing having an intermediate base, the measurement insert being accommodated in a lower housing section which is adjacent to the measuring resistor and is sectioned off by the intermediate base, and the measuring transducer being accommodated in an opposite, upper housing section such that the measurement insert and the measuring transducer are individually detachable from the intermediate base; and
plural contact-pressure springs to electrically connect the measuring resistor to the measurement insert, wherein the springs have a longitudinal section whose basic shape is conical.

* * * * *